United States Patent (10) Patent No.: US 11,960,036 B2
Hardy et al. (45) Date of Patent: Apr. 16, 2024

(54) DEVICE AND METHOD FOR PROCESSING SIGNALS FROM A SET OF ULTRASONIC TRANSDUCERS

(71) Applicant: COMMISSARIAT A L'ENERGIE ATOMIQUE ET AUX ENERGIES ALTERNATIVES, Paris (FR)

(72) Inventors: Emmanuel Hardy, Grenoble (FR); Bruno Fain, Grenoble (FR); Thomas Mesquida, Grenoble (FR); François Rummens, Grenoble (FR); Elisa Vianello, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 111 days.

(21) Appl. No.: 17/727,539

(22) Filed: Apr. 22, 2022

(65) Prior Publication Data

US 2022/0342062 A1 Oct. 27, 2022

(30) Foreign Application Priority Data

Apr. 26, 2021 (FR) ..................................... 2104297

(51) Int. Cl.
*G01S 15/00* (2020.01)
*G01S 7/527* (2006.01)
(Continued)

(52) U.S. Cl.
CPC ............ *G01S 7/533* (2013.01); *G01S 7/5273* (2013.01); *G01S 7/539* (2013.01); *G10K 11/20* (2013.01)

(58) Field of Classification Search
CPC ........ G01S 7/533; G01S 7/5273; G01S 7/539; G01S 7/52036; G01S 15/8915;
(Continued)

(56) References Cited

U.S. PATENT DOCUMENTS 8,265,191 B2 * 9/2012 Bowman ................ G01V 15/00
375/334
2004/0117090 A1 * 6/2004 Samukawa ........... G01S 7/4972
701/45
(Continued)

FOREIGN PATENT DOCUMENTS

WO WO-2022158205 A1 * 7/2022

OTHER PUBLICATIONS

Nandakumar, et al., "FingerIO: Using Active Sonar for Fine-Grained Finger Tracking", Proceedings of the 2016 CHI Conference on Human Factors in Computing Systems, pp. 1515-1525, May 2016.
(Continued)

*Primary Examiner* — Tai T Nguyen
(74) *Attorney, Agent, or Firm* — BakerHostetler

(57) ABSTRACT

A processing system for processing signals from a plurality of transducers of an ultrasonic sensor in order to determine characteristic information relating to an object detected by the ultrasonic sensor is provided. The system comprises a coupling device for transforming the signals received from the transducers into pulses, and a pulse processing unit for determining the characteristic information based on the pulses delivered by the coupling device. The coupling device comprises: a thresholding unit for applying, for each signal received from a transducer, thresholding to a signal derived from the signal received from the transducer and extracting directional information contained in the phase of the derived signal; a transformation unit for transforming the derived signal into pulses containing the phase of the signal, using the information extracted by the thresholding unit.

18 Claims, 16 Drawing Sheets

(51) Int. Cl.
*G01S 7/533* (2006.01)
*G01S 7/539* (2006.01)
*G10K 11/20* (2006.01)

(58) Field of Classification Search
CPC .. G01S 7/52028; G01S 15/42; G01S 7/52003; G01S 15/8906; G10K 11/20; G10K 11/346; G06F 3/017
USPC .......................................................... 367/93
See application file for complete search history.

(56) References Cited

U.S. PATENT DOCUMENTS

2005/0135190 A1* 6/2005 Katou .................... G01S 7/5273
  367/99
2019/0129026 A1* 5/2019 Sumi .................... G01S 7/52038

OTHER PUBLICATIONS

Das, et al., "Ultrasound based gesture recognition", 2017 IEEE International Conference on Acoustics, Speech and Signal Processing (ICASSP), pp. 406-410, Mar. 2017.

Ling, et al., "UltraGesture: Fine-Grained Gesture Sensing and Recognition" 2018 15th Annual IEEE International Conference on Sensing, Communica-tion, and Networking (SECON), pp. 1-9, Jun. 2018.

Wang, et al., "Device-free gesture tracking using acoustic signals", Proceedings of the 22nd Annual International Conference on Mobile Computing and Net-working, pp. 82-94, Oct. 2016.

Yun, et al., "Turning a Mobile Device into a Mouse in the Air", Proceedings of the 13th Annual International Conference on Mobile Systems, Applications, and Services, pp. 15-29, May 2015.

Li, et al., "SonicOperator: Ultrasonic gesture recognition with deep neural network on mobiles", 2017 IEEE SmartWorld, Ubiquitous Intelligence Computing, Advanced Trusted Computed, Scalable Computing Communications, Cloud Big Data Com-puting, Internet of People and Smart City Innovation (Smart-World/SCALCOM/UIC/ATC/CBDCom/IOP/SCI), pp. 1-7, Aug. 2017.

Ibrahim, et al., "Low Complexity Multi-directional In-Air Ultrasonic Gesture Recognition Using a TCN", 2020 Design, Automation Test in Europe Conference Exhibition (DATE), pp. 1259-1264, Mar. 2020.

Chen, et al., "Angle-of-arrival-based gesture recognition using ultrasonic multi-frequency signals", 2017 25th European Signal Processing Conference (EUSIPCO), 2017.

* cited by examiner

DEVICE AND METHOD FOR PROCESSING SIGNALS FROM A SET OF ULTRASONIC TRANSDUCERS

CROSS-REFERENCE TO RELATED APPLICATION

This application claims priority to foreign French patent application No. FR 2104297, filed on Apr. 26, 2021, the disclosure of which is incorporated by reference in its entirety.

FIELD OF THE INVENTION

The invention relates in general to the field of detection systems, and in particular to a device and a method for processing signals from a set of ultrasonic transducers.

BACKGROUND

Ultrasonic sensors are nowadays used in numerous applications such as spatial localization, gesture detection, fingerprint recognition, biomedical images, etc.

An ultrasonic sensor emits short high-frequency ultrasonic signals at regular intervals or continuously. These pulses propagate through the air at the speed of sound. When they encounter an object, they are reflected and return to the sensor in the form of an echo, which sensor may then compute the distance between itself and the object using the time that has elapsed between the emission of the signal and the reception of the echo by the sensor.

The use of ultrasonic sensors often requires relatively burdensome near-sensor signal processing in order to extract the relevant information therefrom, depending on the application, such as for example distance and angle for object localization, motion type for gesture detection, validation information in the case of fingerprint recognition, and diagnostic information in the case of a biomedical image.

Various gesture detection solutions have been proposed, such as time-of-flight-based measurement solutions, as described for example in:
- R. Nandakumar, V. Iyer, D. Tan, and S. Gollakota, "FingerIO: Using Active Sonar for Fine-Grained Finger Tracking," in *Proceedings of the 2016 CHI Conference on Human Factors in Computing Systems*, New York, NY, USA, May 2016, pp. 1515-1525, doi: 10.1145/2858036.2858580.
- A. Das, I. Tashev, and S. Mohammed, "Ultrasound based gesture recognition," in 2017 *IEEE International Conference on Acoustics, Speech and Signal Processing (ICASSP)*, March 2017, pp. 406-410, doi: 10.1109/ICASSP.2017.7952187.
- K. Ling, H. Dai, Y. Liu, and A. X. Liu, "UltraGesture: Fine-Grained Gesture Sensing and Recognition," in 2018 *15th Annual IEEE International Conference on Sensing, Communication, and Networking (SECON)*, June 2018, pp. 1-9, doi: 10.1109/SAHCN.2018.8397099.

Other gesture detection solutions, based on Doppler measurements, have been proposed, as described for example in:
- W. Wang, A. X. Liu, and K. Sun, "Device-free gesture tracking using acoustic signals," in *Proceedings of the 22nd Annual International Conference on Mobile Computing and Networking*, New York, NY, USA, October 2016, pp. 82-94, doi: 10.1145/2973750.2973764.
- S. Yun, Y.-C. Chen, and L. Qiu, "Turning a Mobile Device into a Mouse in the Air," in *Proceedings of the 13th Annual International Conference on Mobile Systems, Applications, and Services*, New York, NY, USA, May 2015, pp. 15-29, doi: 10.1145/2742647.2742662.
- X. Li, H. Dai, L. Cui, and Y. Wang, "SonicOperator: Ultrasonic gesture recognition with deep neural network on mobiles," in 2017 *IEEE SmartWorld, Ubiquitous Intelligence Computing, Advanced Trusted Computed, Scalable Computing Communications, Cloud Big Data Computing, Internet of People and Smart City Innovation (SmartWorld/SCALCOM/UIC/ATC/CBDCom/IOP/SCI)*, August 2017, pp. 1-7, doi: 10.1109/UIC-ATC.2017.8397483.
- E. A. Ibrahim, M. Geilen, J. Huisken, M. Li, and J. P. de Gyvez, "Low Complexity Multi-directional In-Air Ultrasonic Gesture Recognition Using a TCN," in 2020 *Design, Automation Test in Europe Conference Exhibition (DATE)*, March 2020, pp. 1259-1264, doi: 10.23919/DATE48585.2020.9116482.

Existing ultrasonic sensors however have complex architectures and are subject to high constraints in terms of dimensioning the components (noise, distortion). Furthermore, they generally implement complex signal-processing steps, such as a fast Fourier transform (FFT) step, a correlation step, a non-linear filtering step, etc. This results in a very high computing time, consumption and calculation time. Moreover, existing ultrasonic sensors have to store intermediate representations of the signal, thereby increasing the hardware resources required.

The ultrasonic technique of ultrasonic transducers for measuring time of flight is not sensitive to the same objects as other techniques (radar, optical) (for example, an ultrasonic wave will be reflected by a transparent glazing).

Moreover, the ultrasonic signal of a single ultrasonic transducer is generally very nondirectional, the ultrasonic wave being emitted or received within an emission cone with an angle typically of several tens of degrees. This means that the processing of the emitted signal provides an object location with a great amount of angular uncertainty when an ultrasonic sensor is used.

To improve the angular resolution of ultrasonic transducer systems, it has been proposed to use triangulation and beamforming techniques. Triangulation methods consist in measuring distance from two (or more) distinct locations. The intersection of two (or more) items of information makes it possible to locate an object with improved precision. However, to be effective, the two pairs of sources/detectors have to be well spaced from one another, this not always being possible or desirable in practice, and possibly posing integration problems.

The beamsteering/beamforming approach denotes a set of complex techniques that make it possible respectively to adjust the characteristics of the ultrasonic beam at emission ("beamsteering"), or to improve the quality of the information measured at reception ("beamforming"). Such a set of techniques is based on the construction of interference between the signals of a set of transducers that sends/measures the signal with a temporal phase offset, which corresponds to the reception/emission angle of the plane wave.

In the case of a conventional "beamsteering" technique, the various transducers of the set of ultrasonic transducers emit signals with a temporal phase offset, such that the acoustic waves generated by the various transducers are constructive, in at least one particular direction, and destructive in the other directions. Multiple emissions with different phase offsets are generally used. Measuring the echoes corresponding to these various emissions makes it possible to improve angular resolution. In the case of "beamforming", a single measurement at reception of the set of transducers may give rise to various signal processing operations, corresponding to various types of interference, each corresponding to an observation direction. It is then possible to determine the angular position of the object. In contrast to triangulation, "beamforming" techniques require the various transducers to be located very close, with a distance between the transducers of less than a half-wavelength of the signal. By default, the system has artefacts, that is to say an unwanted emission/sensitivity in certain directions. Such artefacts greatly worsen the performance of the system (presence of network lobes in the directivity pattern of the ultrasonic sensor, due to spatial aliasing).

To the extent that such a measurement principle is based on inter-signal interference, it is important for the various signals to be at the same frequency. In practice, due to the inhomogeneity of the characteristic frequencies of the ultrasonic transducers of one and the same set of transducers, ultrasonic systems, in particular those implementing beamforming techniques, use signals containing primarily a relatively lengthy steady state, since the frequency of the signal in steady state does not depend on the characteristic frequency of the transducer, and the signal-to-noise ratio is more favourable in steady state. In addition, a lengthy signal makes it possible to improve the performance of matched filters that are conventionally used. However, if emission and reception are performed by the same transducer(s), the two operations might not be performed at the same time, meaning that the system is "blind" for the duration of the emission. When emission and reception are performed by different transducers, the system is generally also blind, since the emission signal may interfere with the reception signal via mechanical or electrical coupling, unless decoupling is present, which is complex to implement. The "blind region" of the component typically corresponds to a propagation duration of around 1 ms. In air (speed of sound=300 m/s), this corresponds to a round trip distance of a few tens of centimetres. It is therefore difficult to use "beamforming" techniques to measure distances shorter than this distance.

Another drawback of "beamforming" lies in the complexity of the processing operations that it implements, in particular when such processing operations have to be embedded or performed in real time.

There is therefore a need for an improved device and an improved method for processing signals from a set of ultrasonic transducers.

SUMMARY OF THE INVENTION

To this end, what is proposed is a processing system for processing signals delivered by an ultrasonic sensor, the ultrasonic sensor comprising a set of transducers, at least some of the transducers of the set of transducers being configured so as to emit signals and/or receive echoes corresponding to the reflection of the signals by a detected object, signals being transmitted by a plurality of transducers of the ultrasonic sensor to the processing system in response to the reception of echoes by said transducers, the processing system being configured so as to determine at least one characteristic item of information relating to the detected object, based on the signals received from the transducers of the ultrasonic sensor. Advantageously, the processing system comprises a coupling device configured so as to transform the signals received from at least some transducers of the set of transducers into pulses, and a pulse processing unit configured so as to process the pulses delivered by the coupling device.

The coupling device comprises:
a thresholding unit configured so as to apply, for each signal received from a transducer, thresholding to a signal derived from said signal received from the transducer, so as to extract directional information contained in the phase of the derived signal, using at least one threshold, the extracted information comprising the rising and/or falling edges of the derived signal;
a signal-to-pulse transformation unit configured so as to transform the signal derived from the signal received from the transducer into pulses containing the phase of the signal, using the one or more signal edges extracted by the thresholding unit.

The pulse processing unit is configured so as to determine at least one characteristic item of information relating to the detected object based on the pulses determined by the coupling device for all of the signals received from the transducers.

In one embodiment, the pulse processing unit comprises at least one classifier.

In one embodiment, said at least one classifier may comprise a main classifier, the main classifier being a pulsed neural network classifier or a non-event-driven classifier.

In one embodiment, said at least one classifier may furthermore comprise a secondary classifier for determining the amplitude of the threshold used by the thresholding unit from among a set of possible threshold amplitude values based on the pulses received from the coupling device.

In one embodiment, the processing system may furthermore comprise a set of amplifiers, the set of amplifiers comprising at least one amplifier and being configured so as to amplify the analogue voltage of each signal received from the transducer.

The processing system may furthermore comprise a set of bandpass filters, the set of bandpass filters comprising at least one bandpass filter and being configured so as to filter the voltage amplified by the set of amplifiers so as to eliminate noise outside the passband, the signal derived from each signal received from the transducer being the signal delivered by the set of bandpass filters.

In some embodiments, the processing system may comprise a controller configured so as to adapt one or more shaping parameters of the signals received from the transducers based on one or more adaptation criteria using signals coming from the pulse processing unit.

In particular, the controller may be configured so as to adapt the threshold used by the thresholding unit based on the distance between the ultrasonic sensor and the object, or based on the quality of previous measurements performed by the ultrasonic sensor, the quality being computed in the pulse domain or after converting the pulse density into a real number.

In one embodiment, the pulse processing unit may comprise a set of coherence detectors comprising at least one coherence detector and a characteristic information determination unit, the set of coherence detectors being configured so as to detect whether the signals coming from the transducers, for a given direction of the echoes coming from the object, are coherent based on the pulses delivered by the into-pulse transformation unit, and to deliver said pulses to the characteristic information determination unit if coherence is detected.

The characteristic information determination unit may be a unit for measuring the distance and/or the direction of the echoes coming from the object.

In one embodiment, the characteristic information determination unit may be a classifier.

In one embodiment, a coherence detector may comprise a leaky integrator for measuring an alignment of the edges of the signals received from the transducers of the set of transducers.

A coherence detector may comprise a windowing unit configured so as to apply windowing in order to detect coherence between the signals received from the transducers based on the pulses delivered by the coupling device, the windowing unit being configured so as to count the number of pulses, from among all of the transmission channels corresponding to the various transducers of the set of transducers, within a window of given width.

In some embodiments, the processing system may furthermore comprise a low-pass filter at the output of the set of coherence detectors configured so as to provide an image of the density of the pulses delivered by the set of coherence detectors and a sampling unit configured so as to sample the low-frequency signal received from the low-pass filter.

The processing system may furthermore comprise an asynchronous counter arranged at the output of the set of coherence detectors configured so as to count the pulses and sample the output of the set of coherence detectors with a clock signal.

In one embodiment, the processing system may furthermore comprise a motion detector arranged at the output of the set of coherence detectors in order to detect the presence of motion in the region monitored by the ultrasonic sensor.

Also provided is a method for processing signals delivered by an ultrasonic sensor, the ultrasonic sensor comprising a set of transducers, at least some of the transducers of the set of transducers emitting signals and/or receiving echoes corresponding to the reflection of the signals by a detected object, the method comprising determining at least one characteristic item of information relating to the detected object, based on the signals received from the transducers of the ultrasonic sensor. Advantageously, the method comprises a step of transforming the signals received from at least some transducers of the set of transducers into pulses, and a step of processing the pulses, the transformation step comprising, for each signal received from a transducer:
  applying thresholding to a signal derived from said signal delivered by the transducer, so as to extract directional information contained in the phase of the derived signal using at least one threshold, the extracted information comprising the rising and/or falling edges of the derived signal;
  transforming the signal derived from the signal received from the transducer into pulses containing the phase of the signal, using the one or more signal edges extracted in the step of applying thresholding,
  the step of processing the pulses comprising determining characteristic information based on the pulses determined for all of the signals received from the transducers.

The embodiments of the invention thus make it possible to couple the transducers of an ultrasonic sensor and a pulse processing unit (pulsed neural network for example) using simplified coupling adapted to the dimensioning constraints of the components (noise, distortion). Such coupling advantageously makes it possible to replace complex signal-processing steps (FFT, correlation, non-linear filtering, etc.) with simple operations (delay, sum, scalar product). This results in numerous advantages, including notably:
  a drastic reduction in consumption and computing time;
  elimination of the storage of intermediate representations of the signal;
  an improvement in the compromise between complexity and quality of the information given by the processing system.

The present invention thus provides coupling of ultrasonic transducers with a pulse processing unit that allows information contained in the initial signal from the transducers to be delivered in an optimized manner (notably more quickly, more reliably, with less energy consumption and less time consumption).

BRIEF DESCRIPTION OF THE DRAWINGS

Other features, details and advantages of the invention will become apparent on reading the description, which is given with reference to the appended drawings, which are given by way of example and in which, respectively.

DETAILED DESCRIPTION

Figure 1:
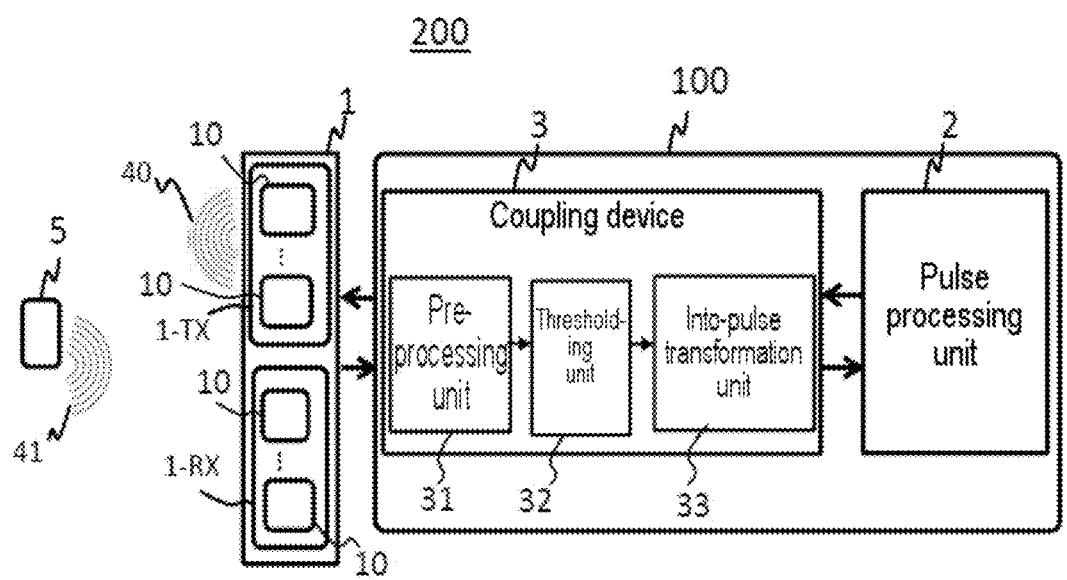
FIG. 1 is a diagram showing one example of an operational system using a processing system for processing signals from a set of ultrasonic transducers, according to some embodiments of the invention.

FIG. 1 shows one example of an operational system 200 using an ultrasonic sensor 1 comprising a set of ultrasonic transducers 10 and a processing system 100 for processing signals from the transducers 10 of the ultrasonic sensor 1, according to some embodiments of the invention.

The set of transducers 10 of the ultrasonic sensor comprises at least two ultrasonic transducers.

The processing system comprises a coupling device 3 and a pulse processing unit 2. The coupling device 3 is configured so as to couple the transducers 10 of the ultrasonic sensor 1 with the pulse processing unit 2.

The set of ultrasonic transducers 10 may comprise a subset of emission transducers 1-TX and a subset of reception transducers 1-RX. As a variant, the same transducers 10 may be used at emission and at reception.

The transducers 10 may for example be MEMS transducers.

Advantageously, the ultrasonic transducers 10 of the set of transducers 1 may be located at the same location, thereby guaranteeing compactness of the system.

In one embodiment, the pulse processing unit may comprise a classifier 2 such as an SNN pulsed neural network or a non-event-driven classifier (for example a convolutional neural network or any other classifier).

As used here, the term "non-event-driven classifier" refers to any classifier implementing non-event-based classification other than a pulsed neural network. A non-event-driven classifier uses a representation of the datum in the form of a sequence of real values rather than in the form of pulses in which the information is contained in their number and position. Some examples of non-event-driven classifiers comprise, without limitation, formal neural networks (for example recurrent neural networks), classifiers based on GMM (acronym for "Gaussian mixture model") algorithms followed by a hidden Markov model (HMM), SVM (acronym for "support vector machine") algorithms, logistic regression algorithms, algorithms based on decision tree models, or else classifiers using rules predefined without learning (not learned automatically). Some exemplary implementations of the classifier may be a recurrent neural network, a Gaussian mixture model (GMM) followed by a hidden Markov model (HMM), or a set of rules predefined without learning.

Signals (emitted signals 40) are initially sent by the ultrasonic transducers 10. Such signals are ultrasonic. When these signals encounter an object 5 (detected object), echoes are formed and reflected (reflected signals 41) to the set of transducers 10. The reflected signals 41 reflected by the object 5 and received by the set of transducers 1 (received signal) are then processed by the processing system 100 in order to determine characteristic information relating to the detected object, depending on the application of the invention. The characteristic information may comprise for example the distance between the ultrasonic sensor 1 and the object, in an object detection application.

The processing system 100 according to the embodiments of the invention is advantageously configured so as to take advantage of the fact that the physical signal at the output of the ultrasonic transducers 10 is relatively close to what is expected at the input of the pulse processing unit 2 (SNN neural network for example).

The processing system 100 may be used in various applications, such as, for example and without limitation, in object detection (detecting the distance and/or the angle of a detected object), gesture detection, or else for pattern recognition in images formed based on ultrasonic signals.

For example, in an application of the invention to object distance detection, object angle detection or gesture detection, the processing system 100 may be used to determine characteristic information relating to the detected object by performing time-of-flight measurements or Doppler measurements.

In such an application, the propagation of a physical signal is used to characterize an object 5 located at a distance. When the emitted signals 40 emitted by the ultrasonic sensor 1 encounter an object, the reflected signals 41 reflected by the object (echoes) and received by the transducers 10 may be measured at a later time using signal processing designed to determine the distance between the source of the signals, corresponding to the set of ultrasonic transducers 10, and the object 5 encountered by the emitted signals, using a "time-of-flight" measurement.

In one application of the invention, the characteristic information relating to the detected object, determined by the pulse processing unit 2 of the processing system 100, may comprise the distance d between the set 1 of ultrasonic transducers and the detected object. In such an application, the distance d may be determined based on the time $T_{vol}$ between the start of the emission of the ultrasonic signal from the sensor 1 (set of signals emitted by the transducers 10) and the start of the echo received by the sensor 1 (set of signals reflected by the transducers 10), using an equation dependent on the time of flight $T_{vol}$, such as for example equation (1):

$$d = \frac{cT_{vol}}{2} \tag{1}$$

The factor 2 present in the denominator of equation (1) takes into account the round trip of the echo, assuming that the emitter (ultrasonic transducers 10) is close to the receiver (detected object 5). In equation (1), c denotes the propagation speed of the acoustic waves in the medium under consideration.

Other techniques for measuring the distance d may be used by the pulse processing unit 2 to determine the distance d information, such as for example a distance measurement using frequency-modulated continuous emission, or an FMCW radar measurement.

In another application of the invention, the characteristic information determined by the pulse processing unit 2 of the processing system 100 may comprise the radial speed of the object 5. In such an application, the processing system 100 may use a Doppler radial speed measurement, which provides the radial speed rather than the position of the object (distance and/or angle of the object), for example for a gesture detection application. Such a Doppler measurement approach is based on:

emission of a signal at a fixed frequency $f_0$;
reflection from a moving object moving at a radial speed v, such as for example a hand performing a gesture, which creates echoes at a frequency $f_0 + \Delta f$:

$$\Delta f = \frac{v}{c} f_0 \tag{2}$$

sequence and frequency signature in various directions, allowing the gestures to be differentiated.

The emission of the ultrasonic signal emitted by an ultrasonic sensor 1 may consist of multiple components at multiple frequencies.

Figure 2:
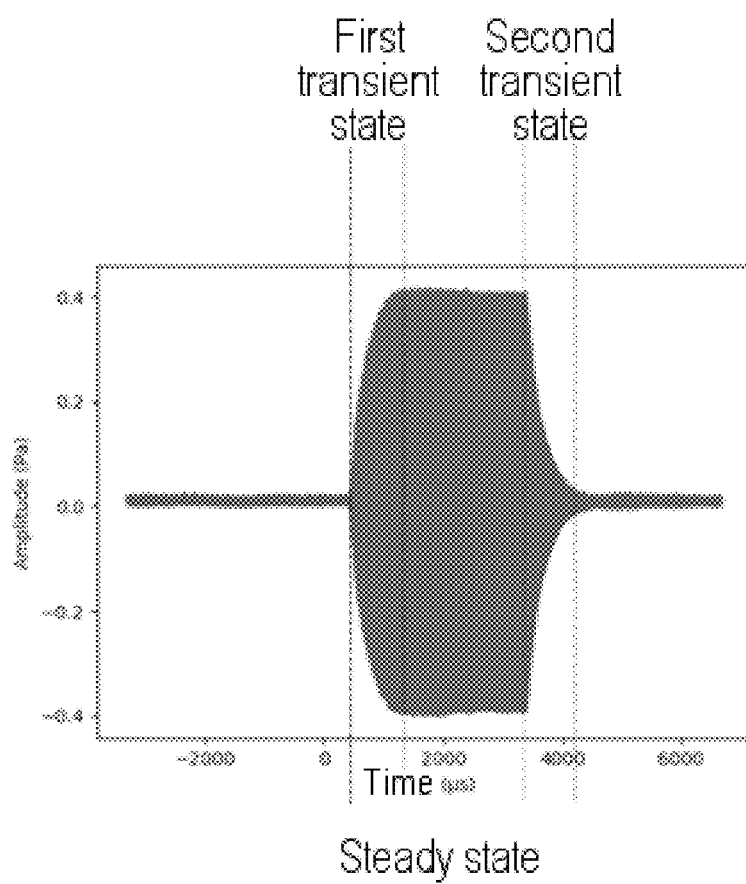
FIG. 2 is a diagram illustrating various states of an ultrasonic signal of short duration ("burst")

FIG. 2 illustrates various states of a short ultrasonic signal ("burst").

FIG. 2 corresponds to a signal emitted by an ultrasonic transducer 10 excited by an electrical signal of fixed frequency and amplitude. The electrical signal consists of a set of sinusoids, with just one and the same frequency, while the ultrasonic signal consists of a first transient excitation state (1), a steady state (2) and a second transient de-excitation state (3). The states (1) and (2) are implemented at a characteristic frequency of the ultrasonic transducer 10, also called "characteristic frequency" below. The characteristic frequency depends on the natural frequency of the transducer 10 and on its quality factor. The second transient state (3) has a sinusoidal signal at the excitation frequency. The difference between the two frequencies of interest is typically a few percent (%). The duration of the transient states is proportional to the quality factor of the transducer. For example, for a quality factor of 50, 100 cycles are generally needed to reach the steady state (2), this typically corresponding to 1 ms for a frequency of around 100 kHz. The processing system 100 is advantageously configured so as to take account of this difference of a few percent (%) and the significance of the transient state. Specifically, in the particular case of very short ultrasonic signals (<1 ms), the signal consists mainly of the two transient states (1) and (3). The frequency of the signal depends on the characteristic frequency of the transducer. It is therefore difficult to produce interference between the signals from various transducers. The coupling device 3 advantageously transforms the signal into pulses and performs thresholding so as to be more robust to this frequency dispersion.

It should be noted that the electrical signal emitted by a transducer and the resulting ultrasonic signal may be more complex. However, the limited passband of the ultrasonic transducer 10 means that the ultrasonic signal has two transient states whose characteristics depend not only on the emission signal but also on the natural characteristics of the transducer 10.

Figure 3:
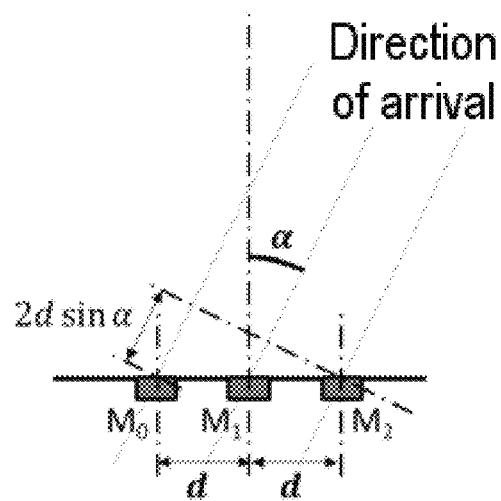
FIG. 3 is a diagram illustrating a phase offset as a function of the angle of incidence of the received echo.

FIG. 3 illustrates the phase offset as a function of the angle of incidence of the received echo, using three transducers $M_0$, $M_1$ and $M_2$. In the example of FIG. 3, the signal arrives with an angle of incidence a on the set of N transducers (10). The difference in distance covered by the signal to arrive at the transducers $M_0$ and $M_2$, separated by 2d, is equal to 2d sin α.

The acoustic wave propagates at the speed of sound c. The time difference $\delta_t$ between the signal received by $M_0$ and $M_2$ is therefore equal to:

$$\delta_t = \frac{2d \sin \alpha}{c} \quad (3)$$

The information is contained in the time difference, that is to say in the phase offset of the signal.

The signals received by the transducers 10 of the ultrasonic sensor 1 are processed by the coupling device 3 and the pulse processing unit 2 in order to determine the one or more characteristic items of information relating to an object 5, depending on the application of the invention.

In one exemplary application to object detection, the characteristic information may for example comprise information indicating whether or not an object has been detected, or the distance between the sensor 1 and the detected object 5, which may be determined based on the received signals 41 received by the transducers 10 by correlating the received signals and the expected signals (the correlation is at a maximum for a delay corresponding to the propagation time). It is possible to send an optimized signal whose autocorrelation has small secondary lobes in order to further improve the distance measurement.

Figure 4:
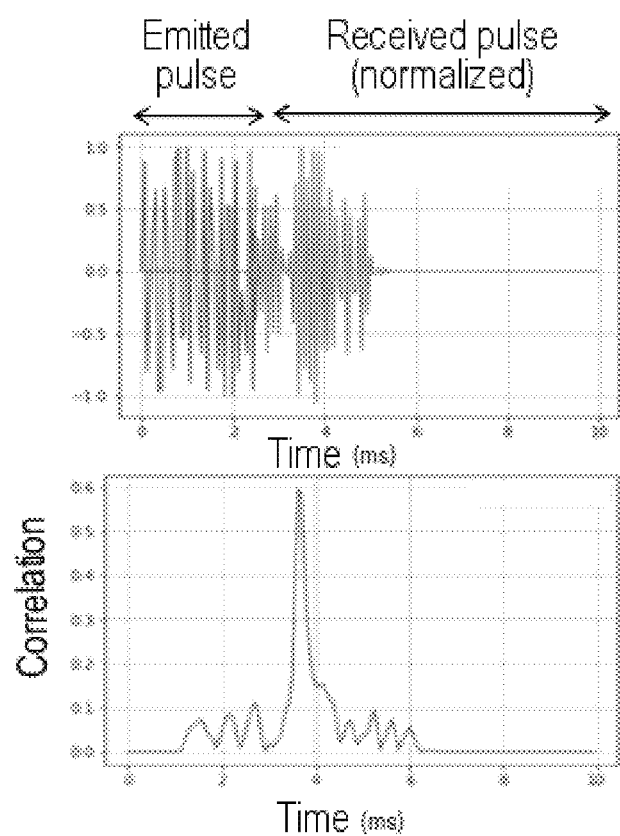
FIG. 4 is a diagram illustrating the matched filter principle, which makes it possible to compute the time of flight by correlating the emitted signal with the received signal.

FIG. 4 illustrates the matched filtering principle, correlating the signal emitted by the sensor 1 with the signal received by the sensor 1.

In another exemplary application of the invention to "time-of-flight" systems, the system 100 may be configured so as to determine characteristic information corresponding to a dynamic characteristic of the object, for example its displacement. The characteristic of the object may be determined by processing multiple successive static signals, by measuring the distance and the angle for multiple successive scenes captured by the ultrasonic sensor 1, and by processing such measurements.

Whereas existing processing systems provide intermediate information about the processing, the processing system 100 according to the invention makes it possible to perform direct and optimized processing by directly providing the characteristic information (for example movement from right to left in a gesture detection application), without intermediate information.

To make the invention easier to understand, the remainder of the description of certain embodiments will be given mainly with reference to a processing system 100 used for object detection or gesture detection, by way of non-limiting example.

The processing system 100 is configured so as to determine characteristic information (for example detection information such as a direction measurement and distance measurement or a gesture detection) using a simplified circuit comprising the coupling device 3 and the pulse processing unit 2.

The signal processing system 100 is configured so as to process the signals delivered by the ultrasonic transducers 10 of the ultrasonic sensor 1.

Beforehand, at least some of the transducers 10 of the ultrasonic sensor 1 emit signals 40. When these signals reach an object 5, echoes 41 are formed, corresponding to the reflected signals 41 reflected by a detected object 5. The reflected signals 41 received by N transducers 10 of the ultrasonic sensor 1 are then transmitted to the processing system 100. The processing system 100 is configured so as to process the signals from the N transducers in order to determine at least one characteristic item of information relating to the detected object 5. Each signal from a transducer 10 is received by the coupling device 3 and corresponds to a processing channel in the coupling device 3.

The coupling device 3 (also called transformation device) is configured so as to transform the signals from the N transducers 10 of the set of transducers 1 into pulses.

The pulse processing unit 2 is configured so as to process the pulses delivered by the coupling device 3 in order to determine at least one characteristic item of information relating to the detected object.

Advantageously, the coupling device 3 comprises:
  a thresholding unit 32 configured so as to apply, for each signal from a transducer 10, thresholding to a signal derived from the signal from the transducer 10 under consideration, so as to extract directional information contained in the phase of the derived signal, using at least one threshold, the extracted information comprising the rising and/or falling edges of the derived signal;
  a signal-to-pulse transformation unit 33 configured so as to transform the signal derived from the signal from the transducer into pulses containing the phase of the signal, using the one or more signal edges extracted by the thresholding unit 32.

The pulse processing unit 2 is configured so as to determine the characteristic information relating to a detected object 5 based on the pulses determined by the coupling device for all of the signals from the transducers 10.

The processing system 100 advantageously has low energy consumption and ensures coupling between the ultrasonic transducers of the set of transducers 1 and the pulse processing unit 2.

Figure 5:
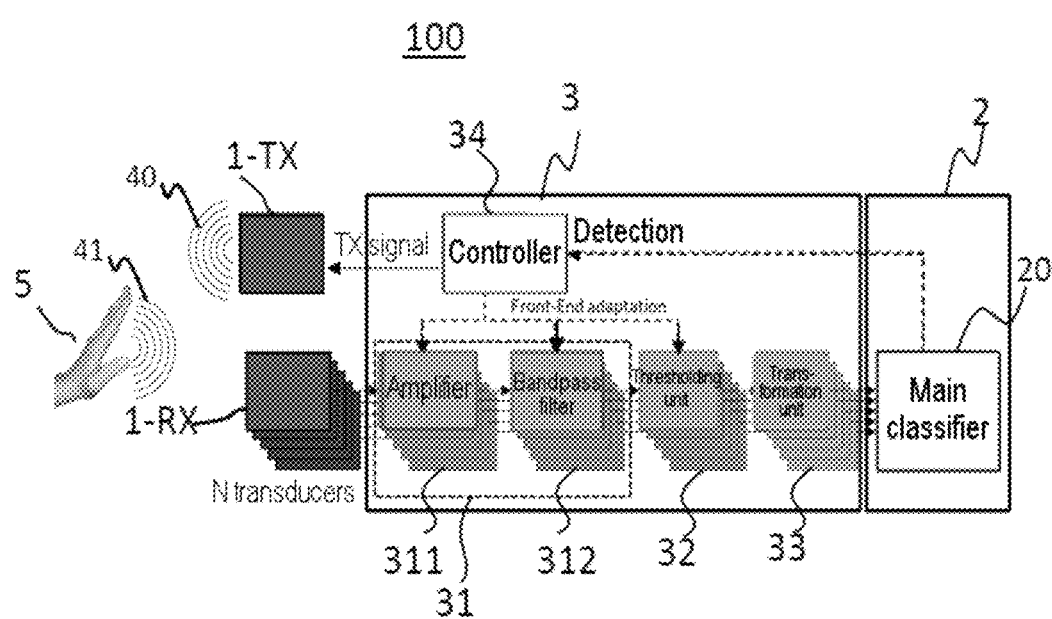
FIG. 5 is a diagram of the processing system, in which the pulse processing unit comprises a pulsed neural network classifier, according to a first embodiment.

FIG. 5 shows a processing system 100 for processing signals from the set of transducers 1, in which the pulse processing unit 2 comprises a pulsed neural network classifier 20, arranged at the output of the into-pulse transformation unit 33, according to a first embodiment.

In such an embodiment, the pulsed neural network 20 is capable, on its own, of learning an optimum way of adding a delay and of combining the various channels associated with the transducers.

FIG. 5 corresponds to one exemplary application of the invention to end-to-end gesture detection 5.

In the example of FIG. 5, the detection system comprises a set of emission transducers 1-TX comprising a plurality of ultrasonic emission transducers 10-TX configured so as to emit an ultrasonic signal at a fixed frequency of short duration, such as for example 250 μs at 100 kHz (acoustic signal).

To measure characteristic information relating to an object 5 (in the example of FIG. 5, the object is a hand) located in the scene covered by the ultrasonic sensor 1, the measurements may be repeated in accordance with a time interval. The time interval may be fixed (for example, a measurement is performed every 10 ms). The characteristic information relating to a detected object 5 in the scene of the sensor 1 may comprise the trajectory of the object. The trajectory of the object 5 may then be determined by aggregating the results of the measurements performed repeatedly during a time period. The characteristic information may furthermore comprise high-level characteristics such as gestures based on the determined trajectory.

In one embodiment, the coupling device 3 of the detection system 100 may comprise a preprocessing unit 31 forming a front-end electronic portion comprising a set of amplifiers 311 and/or a set of bandpass filters 312. The preprocessing unit 31 is configured so as to convert the physical signal (charge, voltage, etc.), received from each of the N transducers (10-RX in the example of FIG. 5), into an analogue voltage. The set of amplifiers 311 comprises at least one amplifier and is configured so as to amplify the thus-converted analogue voltage so as to make it more immune to noise liable to be added to the signal. The set of bandpass filters 312 comprises at least one bandpass filter and is configured so as to filter the voltage (where applicable after amplification by the set of amplifiers 311) in order to eliminate noise outside the passband.

In the example of FIG. 5, the thresholding unit 32 is configured so as to apply thresholding to the filtered signal delivered by the preprocessing unit 31 (signal derived from the signal from each of the N transducers) in order to retrieve the directional information contained in the phase of the filtered signal using at least one threshold.

In some embodiments, the thresholding unit 32 may be configured so as to apply thresholding to the signal derived from the signal from each of the N transducers so as to retain only the rising edge of the signal. As a variant, the threshold unit 32 may be configured so as to retain only the falling edge or both edges (rising and falling).

The coupling device 3 thus corresponds to the analogue domain, while the pulse processing unit 2 corresponds to the pulse domain and the controller 34 corresponds to a mixed-signal domain.

Figure 6:
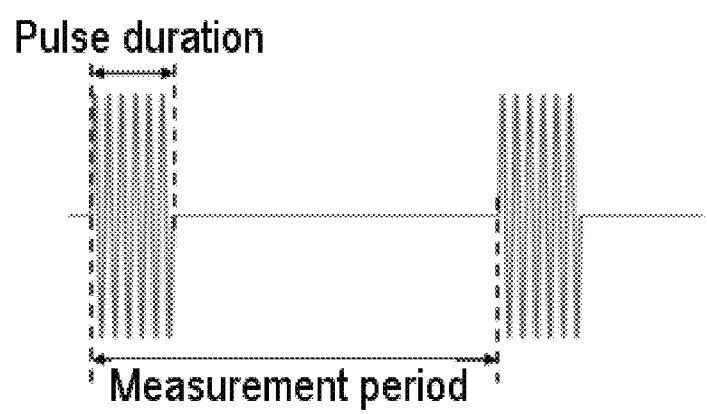
FIG. 6 illustrates the typical electronic excitation signal of a transducer, consisting of multiple successive signals.

One example of an electronic excitation signal emitted by a transducer is shown in FIG. 6, this signal consisting of multiple successive signals.

Figure 7:
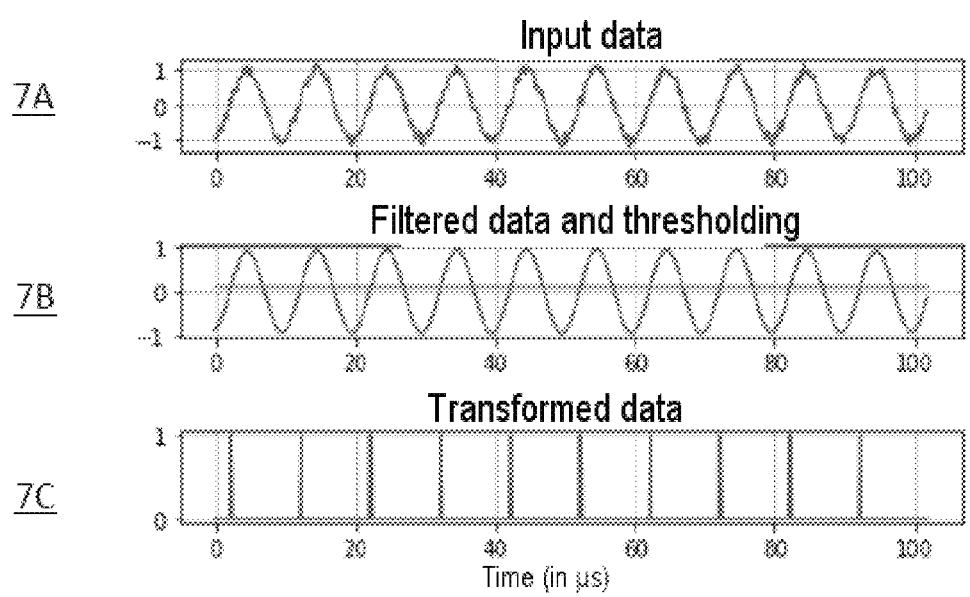
FIG. 7 illustrates the transformation of the input signal into pulses containing the phase of the signal using the rising edge after thresholding, according to one embodiment.

FIG. 7 illustrates the successive steps of transforming the signal from one of the N transducers (10-RX in the example of FIG. 5) into pulses containing the phase of the signal, retaining only the rising edge after thresholding, implemented by the coupling device 3, in the exemplary embodiment of FIG. 5. The top graph 7A in FIG. 7 shows the signal received from one of the N transducers (10-RX), the central graph 7B in FIG. 7 shows the signal after amplification by the set of amplifiers 311, filtering by the set of bandpass filters 312, and thresholding by the thresholding unit 32. The bottom graph 7C in FIG. 7 shows the data obtained after transformation into pulses by the transformation unit 33.

In some embodiments, the coupling device 3 of the processing system 100 may furthermore comprise a controller 34 configured so as to adapt one or more shaping parameters of the signals. For example, the controller 34 may be configured so as to adapt the threshold used by the thresholding unit 32 in order to determine the phase of the signal, in accordance with one or more adaptation criteria such as criteria relating to the distance or to the quality of the signal. In some embodiments, the controller 34 may be configured so as to dynamically or statically adapt the shaping parameters of the signals from the N transducers.

In some embodiments, the parameter controller 34 may be configured so as to adapt the threshold used by the thresholding unit 32 based on the distance between the ultrasonic sensor 1 and the detected object 5. For example, the parameter controller 34 may reduce the value of the threshold during the measurement in order to adapt it to the reduction in the amplitude of the echo of the signal with distance.

In another embodiment, the parameter controller 34 may be configured so as to adapt the value of the threshold based on the quality of previous measurements, computed in the pulse domain or after conversion of the pulse density into a real number.

As a variant, the threshold used by the thresholding unit 32 to obtain the phase of the signal may be fixed.

The controller 34 may use information provided by the pulse processing unit 2.

For example, in one embodiment, the pulse processing unit 2 may comprise, in addition to the main classifier, a secondary classifier configured so as to determine an optimum amplitude for the threshold based on intermediate representations of the information in the transmission chain, in a pulse or non-pulse domain. In one embodiment, the secondary classifier may determine the amplitude of the threshold from among a set of possible threshold amplitude values. In one embodiment, the secondary classifier may be a pulsed secondary neural network (SNN), as illustrated in FIG. 8.

In the embodiments in which the classifier 20 is a non-event-driven classifier, the coupling device may furthermore comprise at least one coherence detector.

Figure 8:
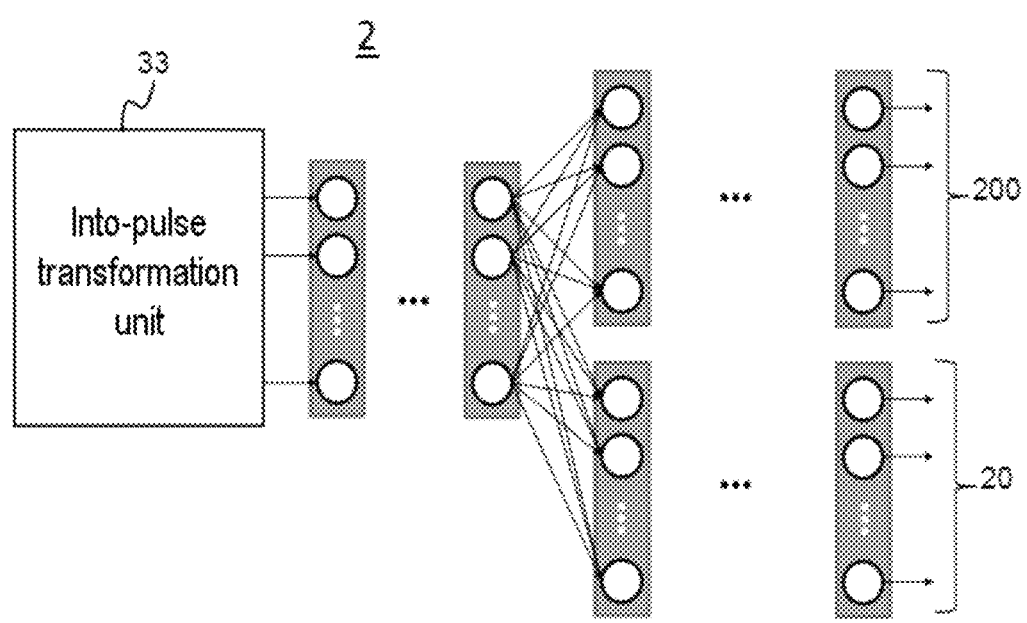
FIG. 8 shows one embodiment in which the pulse processing unit comprises a main classifier used for gesture detection and a secondary classifier used for threshold selection.

FIG. 8 shows one example of a pulse processing unit 2 comprising an SNN neural network main classifier 20 used to determine the characteristic information relating to a detected object 5 based on received pulses (for example for gesture detection), and a secondary classifier 200, for example an SNN neural network, configured so as to select the threshold to be used by the thresholding unit 32 and transmit the threshold information to the controller 34.

In some embodiments, the controller 34 may furthermore be configured so as to synchronize the various functional blocks of the processing system 100 in order to implement relevant feedback. The controller 34 may notably be configured so as to control the time of sending of the pulses (at emission) and synchronize the emission with the reception in order to be able to measure the information of interest (for example the time of flight). The controller 34 may furthermore be configured so as to select a time interval of interest in which the echoes from objects located at a chosen distance interval will be received. In terms of feedback, the controller 34 may retrieve information about any functional block, i.e. about the signal before/after amplification, before/after filtering, before/after thresholding in order to dynamically adapt detection parameters. For example, in the embodiment of FIG. 5, a portion of the pulsed neural network 20 is dedicated to choosing an optimum threshold for the channel measurement.

The pulse transformation unit 33 is configured so as to determine a pulse density for each of the N channels corresponding respectively to the N transducers 10 at the origin of the signals processed by the processing system 100. The pulse densities thus determined may be used at the input of the pulse processing unit 2.

In the embodiment of FIG. 5, the pulse processing unit 2 comprises a main classifier 20 (for example a pulsed neural network) for determining classification information based on the pulses delivered by the coupling device 3, that is to say without having to involve an intermediate representation of the data. In such an embodiment, the characteristic information relating to a detected object 5 comprises classification information, such as for example end-to-end gesture classification information in the embodiment of FIG. 5.

In the embodiment in which the main classifier 20 is a non-event-driven classifier, the non-event-driven classifier takes the signal at input, which signal may be processed beforehand by a post-filtering block, in the form of a frame vector. Upon each frame t, the classifier 20 makes a decision about the nature of the gesture based on the frame and the preceding frames and potentially the following frames over a certain window.

Figure 9:
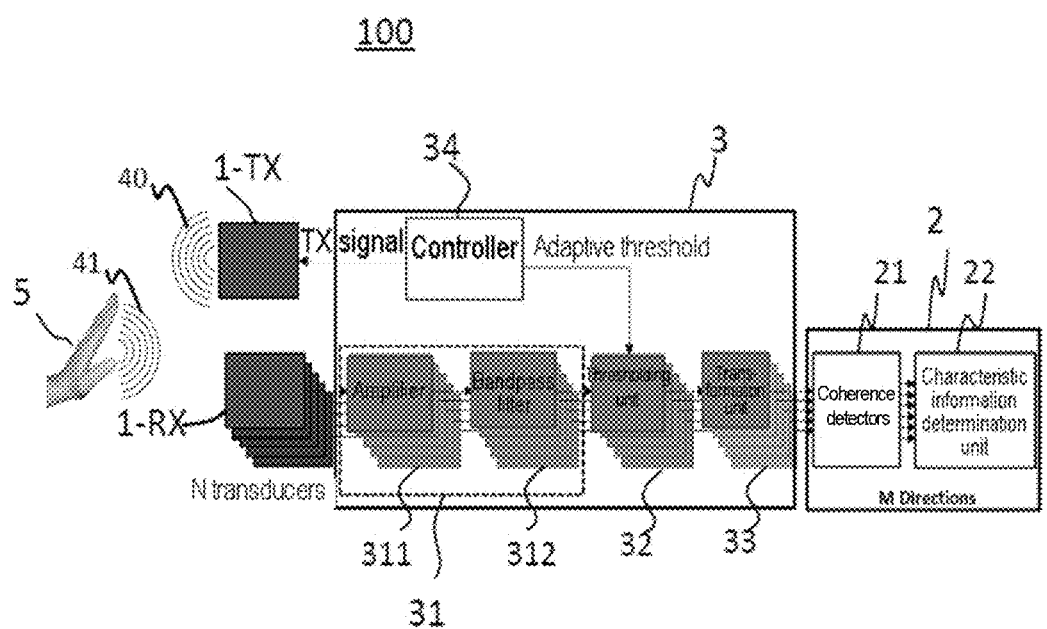
FIG. 9 is a diagram of the processing system, in which the pulse processing unit comprises a set of coherence detectors, according to a second embodiment.

FIG. 9 shows a processing system 100 according to a second embodiment.

In this second embodiment, the components 31, 32, 33 and 34 of the processing system 100 are similar to those described with reference to FIG. 5 corresponding to the first embodiment. However, the processing system 100 according to the second embodiment differs from the first embodiment, shown in FIG. 5, in that the pulse processing unit 2 comprises, rather than the pulsed classifier 20, a set of coherence detectors 21 comprising at least one coherence detector, followed by a characteristic information determination unit 22. The characteristic information determination unit 22 is configured so as to determine at least one characteristic item of information relating to a detected object 5 detected by the ultrasonic sensor 1 (for example distance and/or direction of the one or more echoes coming from various objects in the scene captured by the ultrasonic sensor 1).

The set of coherence detectors 21 uses the directions of incidence of the echoes coming from the various objects in the scene captured by the ultrasonic sensor 1.

To verify that an echo is coming from a given direction of incidence, as illustrated in FIG. 3, it is verified that the signals of the N emission channels corresponding to the N transducers are in phase, if applying a theoretical phase offset associated with this direction, as defined by equation 2. The set of coherence detectors 21 is configured so as to provide, in parallel, coherence information for M directions based on the N channels corresponding respectively to the N transducers.

The output of a coherence detector 21 has a certain pulse density at a time t depending on whether the signals received in this direction are coherent. The set of coherence detectors 21 thus detect whether or not the signals received in a direction are coherent.

In one embodiment, a coherence detector 21 may comprise a leaky integrator LIF for measuring the alignment of the edges of the signals corresponding to the N respective channels corresponding to the N transducers.

Figure 10:
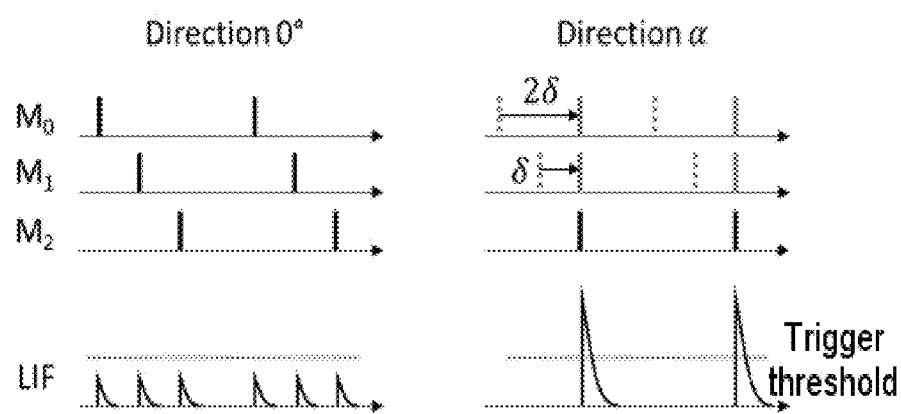
FIG. 10 illustrates coherence detection with a leaky integrator, according to one embodiment of the invention.

FIG. 10 illustrates coherence detection implemented by the set of coherence detectors 21 using a leaky integrator (leaky integrate-and-fire), considering an example of M=2 directions (0° and α) and M=3 transmission channels, corresponding to the use of three emission transducers $M_0$, $M_1$ and $M_2$. Assuming that the echo comes from the direction of angle α, and not applying any delay to the channels, it may be observed that the three signals corresponding to the three channels associated respectively with the three transducers $M_0$, $M_1$ and $M_2$ have edges that are not aligned, as shown in the left-hand graph in FIG. 10. The edges would be aligned if the direction of incidence were to be 0°. By applying the theoretical phase offset associated with the direction of angle α, the edges become aligned, as shown in the right-hand graph in FIG. 10.

The expression of a leaky integrator LIF in the discrete time domain is given in equation (3).

$$\begin{cases} a_n = ka_{n-1} + x_n \\ y_n = 1 \text{ if } a_n \geq \theta, 0 \text{ otherwise} \end{cases} \quad (3)$$

In equation (3):

$x_n$ denotes the pulse train received at input of the LIF (corresponding to the output of the signal-to-pulse transformation unit 33), $a_n$ denotes the activation parameter of the LIF, $y_n$ denotes the output of the LIF, the coefficient k is positive and strictly less than 1, and θ denotes the coherence threshold (the coherence threshold is distinct from the threshold applied by the thresholding unit 32).

If the activation parameter $a_n$ is greater than or equal to the coherence threshold θ, the output of the LIF $y_n$ takes the value 1, this meaning that coherence is detected between the signals corresponding to the N channels for a given direction.

In some embodiments, the LIF may also be implemented in continuous time with an analogue implementation, using a similar operating principle. Equation (3) is then replaced with an equation that is a function of time rather than being a recurrence equation.

The set of coherence detectors 21 has the advantage of being able to operate even if the various signals to be compared (signals corresponding to the N channels) have different amplitudes, this being the case if the signal is in transient state or if the transducers 10 are different from one another. Such coherence detection processing is therefore robust to a certain technological variability.

Furthermore, the set of coherence detectors 21 operates even if the signals do not have exactly the same frequency, for example in transient state.

In one variant embodiment, the set of coherence detectors 21 may comprise a windowing unit configured so as to apply windowing, rather than an LI F for detecting the coherence between the signals based on the received pulses.

Windowing-based coherence detection consists in counting the number of pulses, from among all of the N contained input channels, within a window of small width. Similarly to the embodiment in which the coherence detectors use an LIF, a coherence threshold may be used to detect coherence between the signals corresponding to the N channels for a given direction. The coherence threshold is then applied to the number of pulses detected within the window that starts upon the first pulse.

Figure 11:
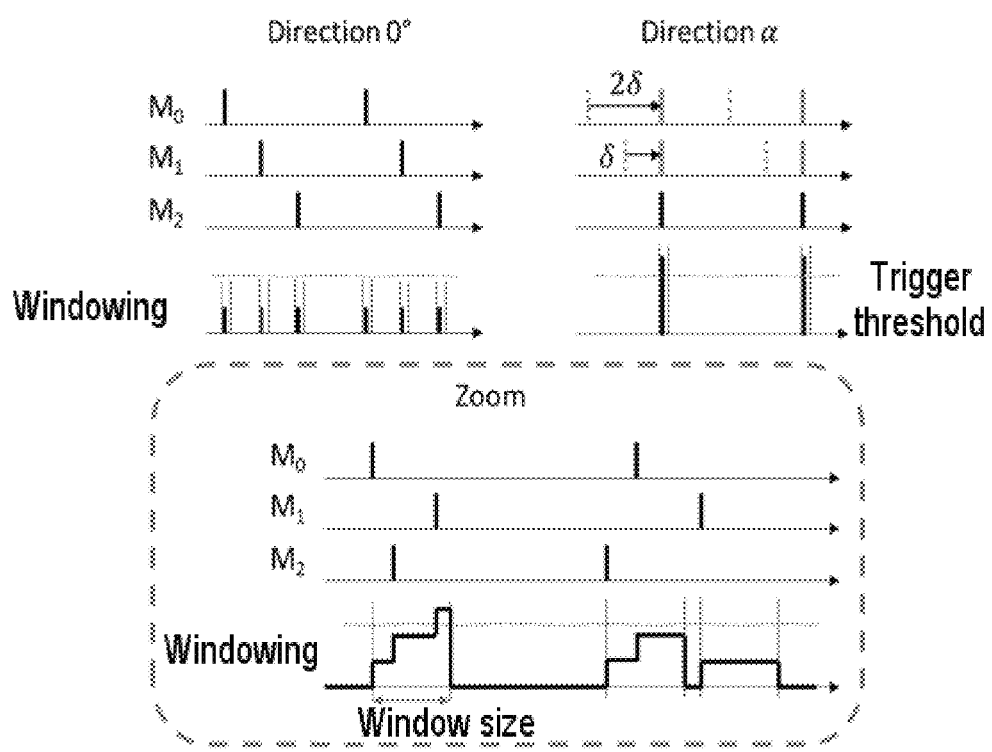
FIG. 11 illustrates windowing-based coherence detection according to one embodiment of the invention.

FIG. 11 illustrates coherence detection implemented by the set of coherence detectors 21 using windowing, according to such an embodiment.

A window is applied at the detection of each rising edge.

The set of coherence detectors 21 provides an output in the form of a plurality of series of pulses. The pulses may be provided directly to a pulsed classifier 20 (SNN). If the classifier 20 is a non-event-driven classifier, the pulses are converted into a pulse density before being transmitted to the classifier 20. The conversion may be performed using a post-processing block comprising a low-pass filter or a counter for counting the number of pulses per time interval (for example 10 ms). The greater the pulse density determined by the coupling device 2 at a given time, the greater the coherence in the signals from the transducers 10 of the ultrasonic sensor 1.

Figure 12:
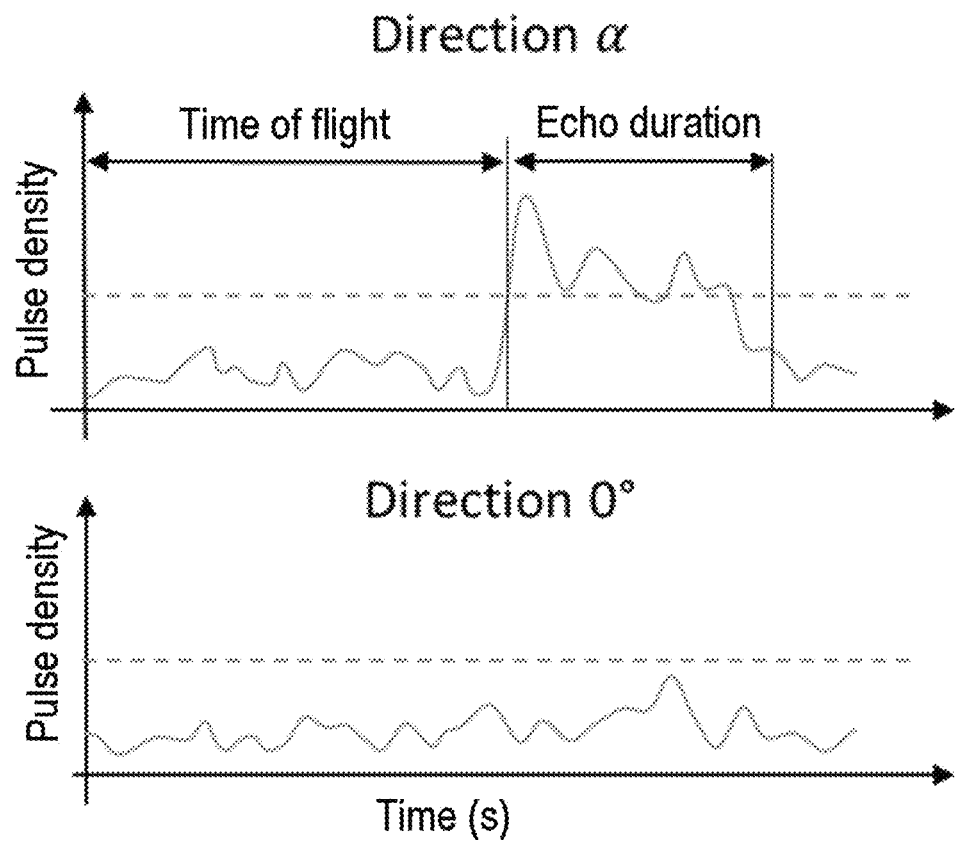
FIG. 12 illustrates the simultaneous outputs of a coherence detector in directions of angles α and 0°, according to one exemplary embodiment.

The characteristic information determination unit 22 may be configured so as to determine the direction of the one or more main echoes based on the output of the coherence detector, as shown in FIG. 12.

FIG. 12 illustrates the density of the pulses delivered by the set of coherence detectors 21 as a function of time, in a direction of one or more echoes of angle α (top graph) and in a direction of one or more echoes of angle 0° (bottom graph). FIG. 12 highlights the time of flight for the distance measurement.

An echo coming from a particular direction leads to a pulse density on the output corresponding to the direction of the echo greater than on the outputs corresponding to the other possible directions. By considering the average value or the maximum on a measurement of the pulse density for all of the given directions, the one or more directions of arrival of the echoes may be determined.

FIG. 12 also illustrates the principle of the distance measurement. By using the same information as for the direction, the distance measurement may be performed at the output of the set of coherence detectors 21 by applying a pulse density threshold to the pulse density, and by computing the distance using equation (1).

Figure 13:
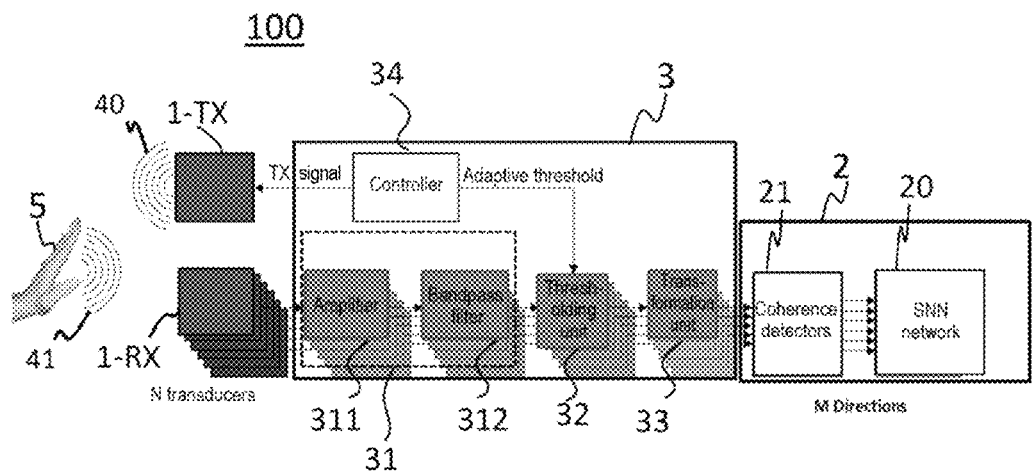
FIG. 13 is a diagram of the processing system, in which the pulse processing unit comprises a pulsed neural network, according to a third embodiment.

FIG. 13 shows a processing system 100, according to a third embodiment. The processing system 100 according to the third embodiment is similar to the processing system according to the second embodiment shown in FIG. 9, and similarly uses a set of coherence detectors 21. However, it additionally uses a pulsed neural network classifier 20 configured so as to provide classification information based on the pulses delivered by the set of coherence detectors. Such a classifier 20 is configured so as to receive the series of pulses delivered by the set of coherence detectors 21.

The characteristic information determination unit 22 of the detection system 100 according to the second embodiment (FIG. 9) is thus replaced with the classifier 20 in the third embodiment.

Figure 14:
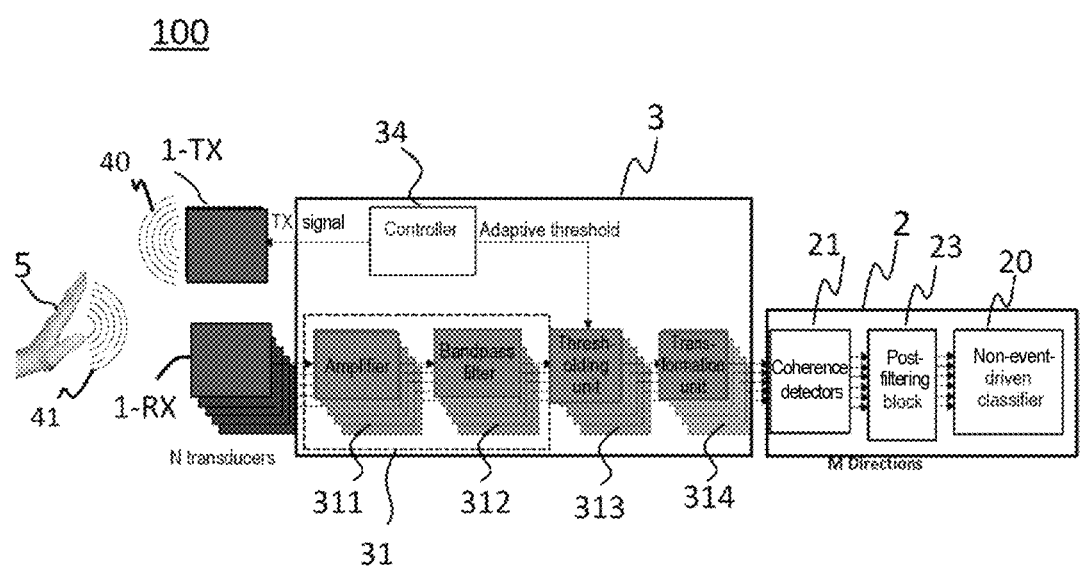
FIG. 14 is a diagram of the object detection system using a coherence detector and a non-event-driven classifier.

FIG. 14 shows a processing system 100, according to a fourth embodiment. The processing system 100 according to the fourth embodiment is similar to the processing system according to the third embodiment shown in FIG. 9, and also uses a set of coherence detectors 21. However, it additionally uses a non-event-driven classifier 20, configured so as to provide classification information based on the pulses delivered by the set of coherence detectors 21, preceded by a post-processing block 23. The post-processing block 23 is configured so as to convert the pulses into a pulse density before being transmitted to the non-event-driven classifier 20. The post-processing block 23 may comprise a low-pass filter at the output of the set of coherence detectors 21 in order to provide an image of the pulse density, rather than a series of pulses, and a sampling unit for sampling the low-frequency signal provided at the output of the low-pass filter in order to process the data. As a variant, the post-processing block 23 may comprise an asynchronous counter arranged at the output of the set of coherence detectors 21 for counting the pulses and sampling the output of the set of coherence detectors with a clock signal.

Figure 15:
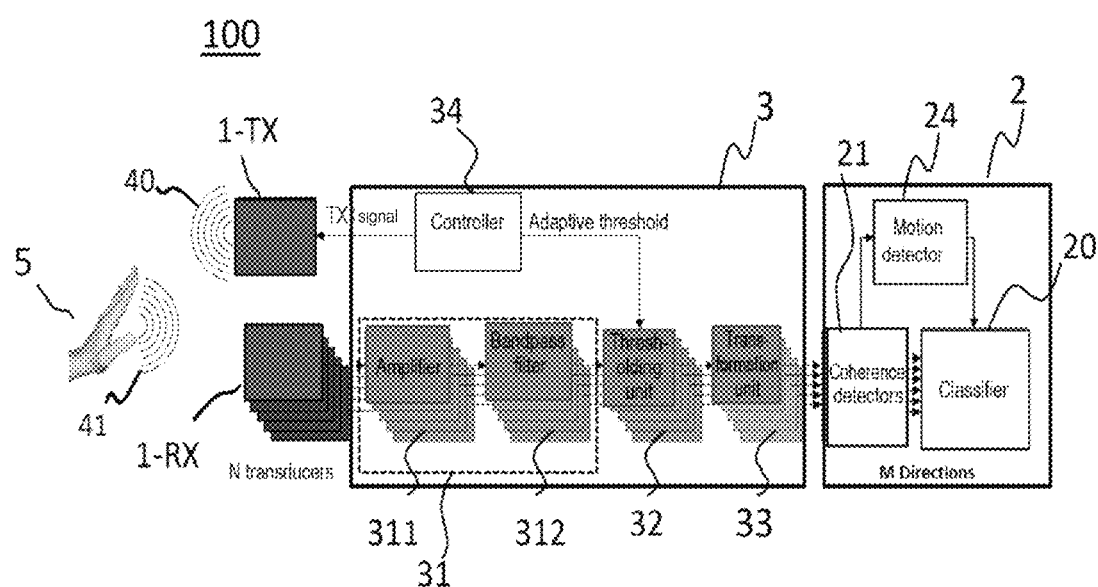
FIG. 15 is a diagram of the object detection system using a coherence detector, a non-event-driven classifier and a motion detector, according to a fourth embodiment.

FIG. 15 shows a processing system 100, according to a fifth embodiment.

The processing system 100 according to the fifth embodiment is similar to the processing system of the third embodiment shown in FIG. 13, and uses a set of coherence detectors 21 in the same way. This fifth embodiment corresponds to an application of the invention to gesture detection. The processing system 100 according to the fifth embodiment furthermore comprises a motion detector 24 for optimizing consumption. The processing system 100 according to the fifth embodiment is notably configured so as to be activated only when motion is detected by the motion detector 24. This makes it possible to avoid activating gesture detection in the absence of motion. Specifically, most of the time, there is no motion in front of the sensor 1 in the region of interest (scene observed by the sensor 1), meaning that there is no need in this case to determine what gesture has been performed. To reduce the consumption of the system in such a static environment in which there is no motion in front of the sensor 1, the classifier 20 may be arranged directly at the output of the into-pulse transformation unit 33 or at the output of the set of coherence detectors 21, as shown in FIG. 15. In the example of FIG. 15, the classifier 20 may then perform a classification in order to detect a gesture when motion is detected by the motion detector.

Hereinafter, consideration is given to the example of FIG. 15, in which the motion detection is performed by the motion detector 24 at the output of the set of coherence detectors 21.

The output of the set of coherence detectors 21 may be represented by a matrix B of dimensions T×N×K, where T is the number of measurements or frames, N is the number of samples per frame (time axis in FIG. 12), and K is the number of directions analysed in the set of coherence detectors 21. The elements of the matrix B are denoted $b_{i,j,k}$.

The number of directions K is less than or equal to the total number of directions M.

The elements of the matrix B correspond to the pulse density within an interval $[t, t+t_{frame}]$ where $t_{frame}$ denotes the length of a frame.

The motion detector 24 then uses the elements of the matrix B.

The motion detector 24 is configured so as to determine a distance matrix D=[$d_{i,j}$] by summing the components $b_{i,j,k}$ on the dimension corresponding to the directions:

$$d_{i,j} = \Sigma_{k=0}^{K-1} b_{i,j,k} \qquad (4)$$

The motion may be quantified by examining the difference between two successive frames on the distance matrix. A difference matrix DD=[$dd_{i,j}$] may then be determined by differentiating the matrix D on the frame axis:

$$dd_{i,j} = d_{i,j} - d_{i-1,j} \qquad (5)$$

A motion predictor $p_i$ may then be computed by multiplying the average and maximum of the difference per frame, using equation (6):

$$p_i = \max_j dd_{i,j} \times \frac{1}{N} \sum_{j=0}^{N-1} dd_{i,j} \qquad (6)$$

Figure 16:
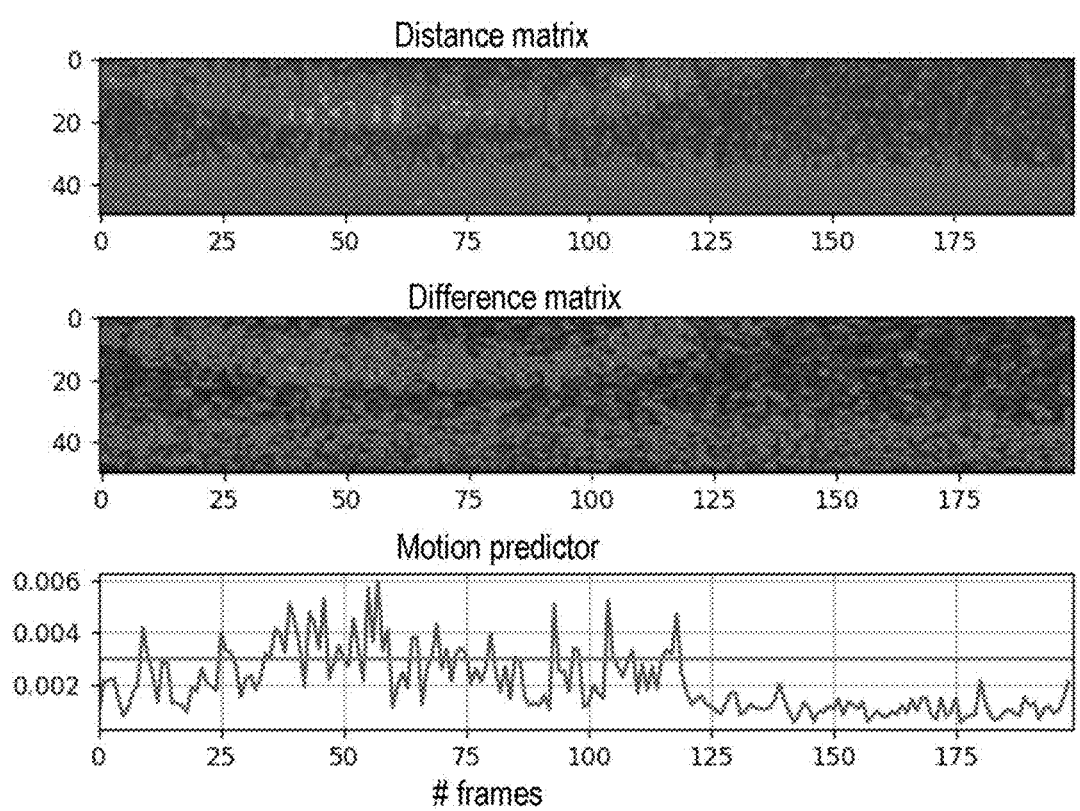
FIG. 16 shows a distance matrix with frame-by-frame differentiation and motion detection.

FIG. 16 illustrates the computing of a motion predictor on real data (distance matrix, frame-by-frame differentiation and motion detection). In the example of FIG. 16, it is possible to observe motion from frame 0 to 120 and then no motion thereafter on the distance matrix. Comparing the motion predictor with a threshold gives a signal that may be used by the gesture detector 25 to determine a gesture classification.

Figure 17:
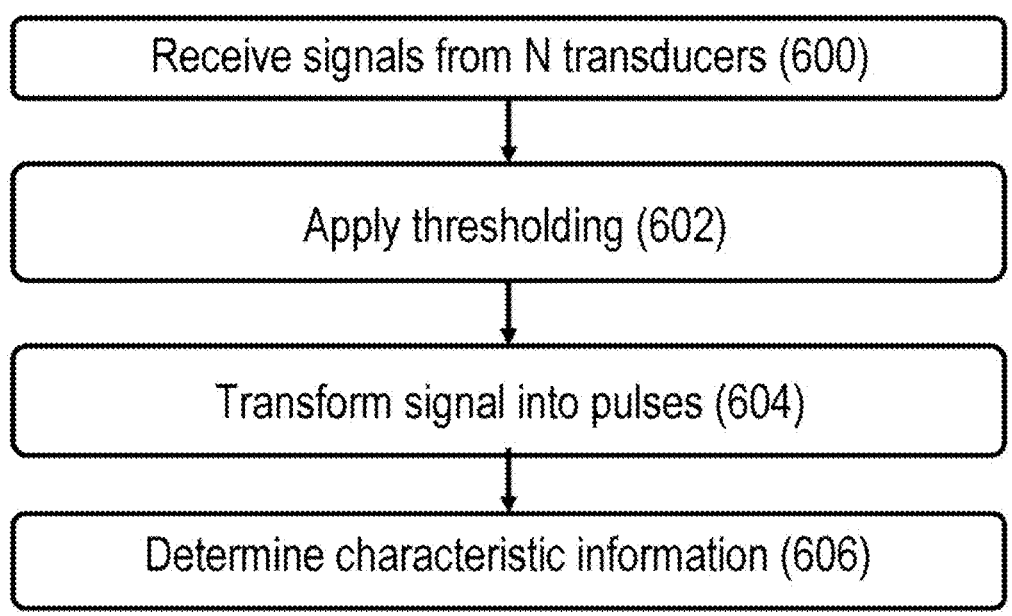
FIG. 17 is a flowchart showing the method for processing signals from a set of ultrasonic transducers.

FIG. 17 illustrates the method for processing signals from a set of transducers, according to some embodiments.

In step 600, at least some of the transducers of the set of transducers emit signals and/or receive echoes corresponding to the reflection of the signals by a detected object 5.

In steps 602 and 604, a step of transforming the signals received from at least some transducers of the set of transducers into pulses is implemented.

More precisely, in step 602, for each signal received at reception by one of the N transducers 10, thresholding is applied to a signal derived from the signal received from the transducer, so as to extract directional information contained in the phase of the derived signal, using at least one threshold, the extracted information comprising the rising and/or falling edges of the derived signal.

In step 604, the signal derived from the signal received from the transducer is transformed into pulses containing the phase of the signal, using the one or more signal edges extracted in the step of applying thresholding.

In step 606, a step of processing the obtained pulses is implemented, the pulse processing step comprising determining characteristic information based on the pulses determined for all of the signals received from the transducers.

The determined characteristic information may then be delivered for additional processing, or to generate a display of this information. As a variant, an action may be triggered based on the determined characteristic information.

The embodiments of the invention make it possible to detect objects, gestures or even dynamic characteristics of objects. However, a person skilled in the art will easily understand that the invention may be used in other applications, for example for fingerprint recognition. In an application of the invention to fingerprint recognition, the set of transducers 1 may be a 2D matrix. Each transducer 10 of the set of transducers 1 sends a pulse, which is returned if the transducer 10 is located facing a "cavity" in the hand, and which is transmitted if the transducer is located facing the skin. The set of returned pulses is used to form an image (at what stage of the processing chain?), which is then processed by the processing system 100.

The embodiments of the invention thus allow direct coupling of the ultrasonic transducers 10 to a pulse processing unit 2 (comprising for example a neural network), making it possible to directly determine the one or more characteristic items of information, depending on the application of the invention.

The processing system 100 according to the embodiments of the invention is advantageously configured so as to improve angular resolution in comparison with ultrasonic transducer systems from the prior art.

The processing system 100 according to the embodiments of the invention is configured so as to make it possible to reduce the blind region of the transducer system, to reduce the complexity of the processing, and to provide robustness to the dispersion in characteristics of the transducers 10 of the set of transducers 1, while still having a certain compactness (the set of transducers 10 is located at the same location) and while providing angular quality information.

More generally, a person skilled in the art will understand that the processing device 100 or subsystems of the device according to the embodiments of the invention may be implemented in various ways by hardware, software or a combination of hardware and software, notably in the form of program code that may be distributed in the form of a program product, in numerous forms. In particular, the program code may be distributed using computer-readable media, which may include computer-readable storage media and communication media. The methods described in the present description may notably be implemented in the form of computer program instructions able to be executed by one or more processors in an information technology computer device. These computer program instructions may also be stored in a computer-readable medium.

Moreover, the invention is not limited to the embodiments described above by way of non-limiting example. It encompasses all of the variant embodiments that may be contemplated by a person skilled in the art. In particular, the invention is not limited to the exemplary applications described above by way of example. It applies to other applications in various fields. For example, in an exemplary application of the invention to the biomedical field, the processing system 100 may be used to provide images obtained by ultrasonography representing the echoes received by a set of ultrasonic transducers. In some cases, not only the first echo but also the following echoes may be represented. Processing the image makes it possible to extract detection information defined depending on the biomedical application (for example thickness of the nape of the neck, etc.). The information that is provided may then be used to aid the medical diagnosis. Advantageously, the embodiments make it possible to simplify the image reconstruction processing operations for ultrasonography systems outside laboratories.

The invention claimed is:

1. A processing system for processing signals delivered by an ultrasonic sensor, the ultrasonic sensor comprising a set of transducers, at least some of the transducers of the set of transducers being configured to emit signals or receive echoes corresponding to a reflection of said signals by a detected object, signals being transmitted by a plurality of transducers of the ultrasonic sensor to the processing system in response to a reception of echoes by said transducers, the processing system being configured to determine at least one characteristic item of information relating to the detected object, based on the signals received from the transducers of the ultrasonic sensor, comprising a coupling device configured so as to transform the signals received from at least some transducers of the set of transducers into pulses, and a pulse processing unit configured to process the pulses delivered by the coupling device, and wherein the coupling device comprises:
- a thresholding unit configured to apply, for each signal received from a transducer, thresholding to a signal derived from said signal received from the transducer, to extract directional information contained in a phase of the derived signal, using at least one threshold, the extracted directional information comprising rising edges or falling edges of the derived signal;
- a signal-to-pulse transformation unit configured to transform the signal derived from the signal received from the transducer into pulses containing the phase of the signal, using the one or more signal edges extracted by the thresholding unit,
- the pulse processing unit being configured to determine at least one characteristic item of information relating to the detected object based on the pulses determined by the coupling device for all of the signals received from said transducers.

2. The system according to claim 1, wherein the pulse processing unit comprises at least one classifier.

3. The system according to claim 2, wherein said at least one classifier comprises a main classifier, the main classifier being a pulsed neural network classifier or a non-event-driven classifier.

4. The system according to claim 2, wherein said at least one classifier further comprises a secondary classifier for determining an amplitude of the threshold used by the thresholding unit from among a set of possible threshold amplitude values based on the pulses received from the coupling device.

5. The system according to claim 1, further comprising a set of amplifiers, the set of amplifiers comprising at least one amplifier and being configured to amplify an analogue voltage of each signal received from the transducer.

6. The system according to claim 5, further comprising a set of bandpass filters, the set of bandpass filters comprising at least one bandpass filter and being configured to filter the voltage amplified by the set of amplifiers to eliminate noise outside a passband, said signal derived from each signal received from the transducer being the signal delivered by the set of bandpass filters.

7. The system according to claim 5, wherein the pulse processing unit comprises a set of coherence detectors comprising at least one coherence detector and a characteristic information determination unit, the set of coherence detectors being configured to detect whether the signals coming from said transducers are coherent, for a given direction of the echoes coming from the object, based on the pulses delivered by an into-pulse transformation unit, and to deliver said pulses to the characteristic information determination unit if coherence is detected.

8. The system according to claim 7, wherein the characteristic information determination unit is a unit for measuring a distance or the direction of the echoes coming from the object.

9. The system according to claim 8, wherein the characteristic information determination unit is a classifier.

10. The system according to claim 7, wherein a coherence detector comprises a leaky integrator for measuring an alignment of the edges of the signals received from said transducers of the set of transducers.

11. The system according to claim 7, wherein a coherence detector comprises a windowing unit configured to apply windowing in order to detect coherence between the signals received from said transducers based on the pulses delivered by the coupling device, the windowing unit being configured to count a number of pulses, from among all of the transmission channels corresponding to the various transducers of the set of transducers, within a window of given width.

12. The system according to claim 7, further comprising a low-pass filter at an output of the set of coherence detectors configured so as to provide an image of a density of the pulses delivered by the set of coherence detectors and a sampling unit configured so as to sample a low-frequency signal received from the low-pass filter.

13. The system according to claim 7, further comprising an asynchronous counter arranged at the output of the set of coherence detectors configured so as to count the pulses and sample the output of the set of coherence detectors with a clock signal.

14. The system of claim 7, further comprising a motion detector arranged at the output of the set of coherence detectors in order to detect a presence of motion in a region monitored by the ultrasonic sensor.

15. The system according to claim 1, comprising a controller configured to adapt one or more shaping parameters of the signals received from the transducers based on one or more adaptation criteria using signals coming from the pulse processing unit.

16. The system according to claim 15, wherein the controller is configured to adapt the threshold used by the thresholding unit based on a distance between the ultrasonic sensor and said object, or based on a quality of previous measurements performed by the ultrasonic sensor, said quality being computed in a pulse domain or after converting pulse density into a real number.

17. A method of processing signals delivered by an ultrasonic sensor, the ultrasonic sensor comprising a set of transducers, at least some of the transducers of the set of transducers emitting signals or receiving echoes corresponding to a reflection of said signals by a detected object, the method comprising determining at least one characteristic item of information relating to the detected object, based on the signals received from the transducers of the ultrasonic sensor, wherein the method comprises a step of transforming the signals received from at least some transducers of the set of transducers into pulses, and a step of processing said pulses, the transformation step comprising, for each signal received from a transducer:
- applying thresholding to a signal derived from said signal delivered by the transducer, to extract directional information contained in a phase of the derived signal using at least one threshold, the extracted information comprising rising edges or falling edges of the derived signal;
- transforming the signal derived from the signal received from the transducer into pulses containing the phase of the signal, using the one or more signal edges extracted in the step of applying thresholding,
- and the step of processing the pulses comprises determining characteristic information based on the pulses determined for all of the signals received from said transducers.

18. A processing system for processing signals delivered by an ultrasonic sensor, the ultrasonic sensor comprising a set of transducers, at least some of the transducers of the set of transducers being configured to emit signals or receive echoes corresponding to a reflection of said signals by a detected object, signals being transmitted by a plurality of transducers of the ultrasonic sensor to the processing system in response to a reception of echoes by said transducers, the processing system being configured to determine at least one characteristic item of information relating to the detected object, based on the signals received from the transducers of the ultrasonic sensor, comprising a coupling device configured to transform the signals received from at least some transducers of the set of transducers into pulses, and a pulse processing unit configured to process the pulses delivered by the coupling device, wherein the coupling device comprises:
- a thresholding unit configured to apply, for each signal received from a transducer, thresholding to a signal derived from said signal received from the transducer, to extract directional information contained in a phase of the derived signal, using at least one threshold, the extracted information comprising rising edges and falling edges of the derived signal;
- a signal-to-pulse transformation unit configured to transform the signal derived from the signal received from the transducer into pulses containing the phase of the signal, using the one or more signal edges extracted by the thresholding unit,
- the pulse processing unit being configured to determine at least one characteristic item of information relating to the detected object based on the pulses determined by the coupling device for all of the signals received from said transducers.

* * * * *